United States Patent [19]
Titus

[11] 3,859,588
[45] Jan. 7, 1975

[54] REVERSE CURRENT PROTECTIVE MEANS FOR RECTIFIER OUTPUT CIRCUITS

[75] Inventor: Charles H. Titus, Newtown Square, Pa.

[73] Assignee: Electro-Petroleum Inc., Bryn Mawr, Pa.

[22] Filed: Feb. 17, 1971

[21] Appl. No.: 116,035

[52] U.S. Cl.......................... 321/47, 307/66, 307/95
[51] Int. Cl. ............................................ H01b 7/28
[58] Field of Search............ 307/46, 48, 51, 66, 95; 320/25; 321/47

[56] References Cited
UNITED STATES PATENTS

| | | | |
|---|---|---|---|
| 2,402,494 | 6/1946 | Hantzsch et al. | 307/95 |
| 3,267,288 | 8/1966 | Maiden et al. | 307/46 X |
| 3,313,995 | 4/1967 | Bach et al. | 320/25 |
| 3,356,922 | 12/1967 | Johnston | 320/25 X |
| 3,419,779 | 12/1968 | Zehner | 307/66 X |
| 3,475,311 | 10/1969 | Hosford | 307/95 X |
| 3,555,398 | 1/1971 | Nestorovic | 321/47 X |

Primary Examiner—R. N. Envall, Jr.
Attorney, Agent, or Firm—J. Wesley Haubner

[57] ABSTRACT

A direct current circuit including a pair of ground electrodes and an electrolytically conductive earth formation therebetween is normally fixedly connected to the high voltage direct current output terminals of a power rectifier. The unidirectional voltage supplied to the terminals through the power rectifier is variable and the power rectifier may be disconnected by control means in its alternating current input circuit. A bias voltage of normal polarity and predetermined low magnitude is supplied to the output terminals by a low voltage battery and blocking rectifier in series circuit relation connected directly across the terminals in opposing relation to the voltage supplied through the power rectifier. Battery charge is maintained through a current limiting impedance of high resistance connected across the blocking rectifier.

5 Claims, 1 Drawing Figure

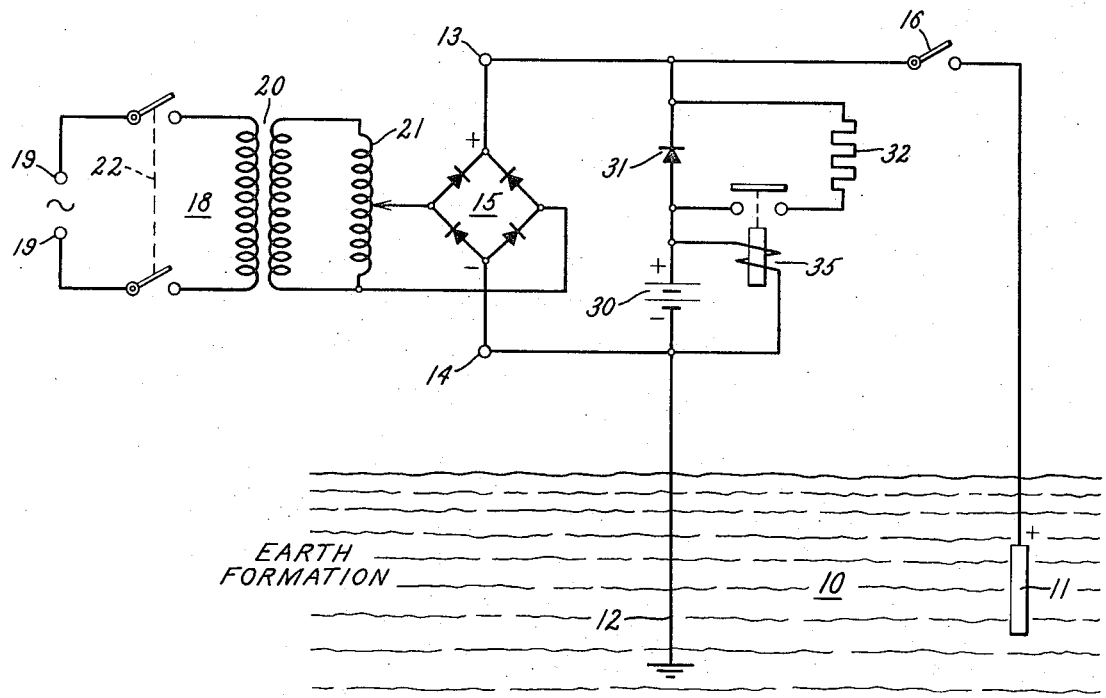

REVERSE CURRENT PROTECTIVE MEANS FOR RECTIFIER OUTPUT CIRCUITS

My invention relates to prevention of current reversal in the output circuit of a high power electric current rectifier adapted to supply direct current through an electrolytically conductive fluid. The invention has particular application to electric power apparatus designed to pass large unidirectional currents through the ground at high voltage and to dissipate substantial amounts of power into the earth, as for in situ treatment of oil, gas, minerals or the like.

In the treatment of oil-bearing earth formations to stimulate or promote the flow of oil to a well it has been proposed to pass unidirectional current through the oil-bearing formation between two electrodes conductively associated with the formation. Such a process is described and claimed in U.S. Pat. No. 3,782,465 by Christy W. Bell and Charles H. Titus assigned to the same assignee as the present application.

In processes of the type referred to unidirectional current of substantial magnitude traverses a path which includes saline water supplied to or present in an earth formation. As a primary or secondary result of such conduction electrolytic action may effect chemical oxidation, reduction and release of gases. While the materials of the anode and cathode may be selected to minimize electrolytic corrosion and disintegration under normal current conduction through the earth from anode to cathode, it is desirable also to protect the anode in the event the main unidirectional supply voltage is removed without opening the direct current load circuit. In ground conduction systems where the electrodes are separated by substantial distance through earth it is possible that differences in ground potential will cause reverse current and detrimental electrolytic action at the normally positive electrode upon removal of forward voltage.

Accordingly it is a general object of my invention to provide means for preventing reversal of output current in a power rectifier load circuit through conductive fluid.

It is a more particular object of my invention to provide an electric protective circuit for preventing chemical and electrolytic damage to current conducting anodes in unidirectional ground conduction apparatus.

In carrying out my invention in one preferred embodiment I utilize an anode conductively associated with an oil-bearing earth formation in a normally unbroken high voltage direct current load circuit. The load circuit has input terminals connected to a source of high voltage direct current supply such as a power rectifier. The anode is formed of or coated with a material selected to be highly resistant to the hostile atmosphere normally developed in the anode region of a saline electrolyte. Such an anode resists oxidation and attack by other negative ions and chemical compounds normally present in the anode region of a unidirectional circuit through connate water in an earth formation. However, various positive ions which normally migrate toward a cathode and chemical compounds subject to formation in the absence of current may result in chemical or electrolytic damage to the anode surface if current is discontinued or reversed. To prevent such damage without interrupting the normally unbroken high voltage direct current load circuit I connect across its input terminals a relatively low voltage battery and a blocking rectifier in series circuit relation, with the battery and the main power rectifier connected in opposing voltage relation. By this arrangement whenever the main power rectifier voltage is removed or reduced below battery voltage, as by disconnection or deenergization of the power rectifier, the low voltage battery continues to supply a bias current in the normal direction through the direct current load circuit.

In the bias current circuit described the charge on the low voltage battery may be maintained by a conventional battery charging rectifier supplied from an alternating current source through an isolating transformer. In a preferred embodiment of my invention however, I bypass the blocking diode in series with the bias battery by means of a current limiting impedance having a resistance considerably greater than that of the load circuit. Through this current limiting resistor the bias battery may be charged from the main power rectifier whenever the rectifier output voltage exceeds battery voltage, but bias current supplied by the battery to the anode traverses the blocking diode.

My invention will be more fully understood and its various objects and advantages further appreciated by referring now to the following detailed specification taken in conjunction with the accompanying drawing, the single FIGURE of which is a schematic circuit diagram of a ground current power supply apparatus embodying my invention.

Referring now to the drawing, I have shown electric current supply apparatus for passing unidirectional current through an earth formation 10 between a positive electrode or anode 11 and a grounded cathode 12, both electrodes being conductively associated with the formation. The anode 11 and cathode 12 are connected respectively to load circuit input terminals 13 and 14 and terminals 13 and 14 are connected to the output circuit of a high voltage power rectifier 15. A manual disconnect switch 16 is shown between the positive terminal 13 and the anode 11. The power rectifier 15 is energized through an input circuit 18 from a suitable source of alternating current supply represented by a pair of supply terminals 19. By way of example the rectifier input circuit 18 is illustrated as including an isolating transformer 20 and a variable voltage autotransformer 21. The input circuit 18 includes also a control switch 22 which may be manually or automatically actuated to energize or deenergize the power rectifier 15 in normal operation.

By way of illustration of a direct current load circuit to which my invention is particularly applicable, the earth formation 10 may be an oil-bearing earth stratum of shale or sand, usually located at a substantial distance below the surface of the earth and thus below the normal water table. The connate water contained in the formation is usually of predominantly saline character but may contain also other salts and minerals. If the connate water is insufficient to support the desired magnitude of current flow additional saline water or other compatible electrolyte may be supplied to the formation, as by pumping through the anode hole or other aperture piercing the formation in the anode region. Current conducted through the earth by means of such saline electrolyte produces electrolytic action whether or not such action is the primary objective of the current conduction. In such action chlorine and oxygen atoms will migrate toward the anode to form hydro-chloric acid and free oxygen in this region. Sodium ions will migrate toward the cathode and combine with hydroxyl radicals to form sodium hydroxide and to free sodium and hydrogen in the cathode region. To protect the anode 11 from attack by chemical elements or compounds in the region and from electrolytic corrosion it is desirable that the anode be formed of or coated with a material having a high degree of resistance to electrolytic corrosion and to chemical attack by elements and compounds in the anode region.

Anode coating materials selected to protect the anode 11 against chemical and electrolytic distintegration in its normal operation as a positive electrode (with respect to the cathode 12), are likely to be susceptible to electrolytic or other damage if subjected to reverse current, such as may occur if voltage is removed from the high voltage terminals 13 and 14 with the load circuit left connected. Such reverse current may, for example, occur as a result of differences in ground potential occurring naturally or as a result of the forward current flow impressed from the load circuit input terminals 13 and 14. Under reverse current conditions with the anode electrode acting as a cathode, oxygen ions and chlorine will migrate toward the normally cathodic electrode and will cause oxidation of the electrode metal and the formation of hydrochloric acid. Hydrogen and possibly other ions migrate toward the normally anodic electrode and tend to promote its disintegration.

In the high voltage, high power direct current load circuit illustrated in the drawing it is usually desirable to initiate, discontinue or otherwise control the flow of direct current through the load circuit by switching and regulating means located in the alternating current input circuit of the power rectifier 15, it being well understood that interruption and control of alternating current is accomplished more readily than is possible with high voltage direct current. For this reason it is desirable that the load circuit input terminals 13, 14 be supplied from a rectifier source and that the direct current output terminals of the rectifier ordinarily be fixedly connected to the load circuit input terminals. The disconnect switch 16 is therefore shown on the load circuit side of terminal 13 and is expected to be used only in abnormal operation, as when it is necessary to withdraw the anode 11 from the anode hole for repair or maintenance. In normal operation then the magnitude of direct current in the earth strata 10 between the electrodes 11 and 12 is controlled by the regulating transformer 21 and the flow of direct current is initiated or interrupted by the switching means 22.

When forward unidirectional power current is interrupted, as by opening the switch 22 to disable the power rectifier 15, the direct current load circuit between the terminals 13 and 14 is unimpaired and subject to the flow of reverse current as described above. To prevent the flow of reverse unidirectional current it is desirable to provide across the load circuit terminals 13 and 14 a similarly poled source of low unidirectional voltage, illustrated as a battery 30. Since the battery 30 is intended to supply only a small bias current to the direct current load circuit it may be of very much lower voltage than the average or maximum rectifier output voltage impressed upon the terminals 13 and 14. For example, the rectifier output may be of the order of several hundred to several thousand volts, while voltage of battery 30 may be of the order of 10 to 20 volts.

To prevent damage to the battery 30 by excessive reverse current it is therefore necessary to provide in series with it across the load circuit terminals 13 and 14 a unilaterally conducting element, such as a blocking rectifier 31 connected to conduct current only from the battery 30.

It will now be observed that the battery 30, acting as a standby or bias source of direct current supply, may be utilized only infrequently. It is desirable therefore that means be provided to maintain the battery in a condition of normal charge during its standby operation. While this may be done by connecting across the battery any conventional battery charger, I find it desirable to utilize for charging purposes the normally higher opposing voltage supplied to the terminals load circuit 13, 14 by the rectifier 15. This I do by providing a current limiting impedance 32 of high resistance in parallel circuit relation with the blocking rectifier 31. It will be understood by those skilled in the art that when the power rectifier 15 is operatively connected to supply high but variable unidirectional voltage across the terminals 13 and 14, charging current will be supplied through the series circuit consisting of the current limiting resistor 32 and the battery 30, with the resistor 30 absorbing a major portion of the voltage drop in the charging circuit. The resistor 32 may be made sufficiently large so that the charging current is very small and may be supplied to the battery 30 over long periods of time without damage. Preferably however, a relay 35 responsive to battery voltage is provided to disconnect resistor 32 so long as battery voltage exceeds a predetermined value indicative of fully charged conditions. When the battery 30 is called upon to supply forward current to the direct current load circuit through the blocking diode 31 the low forward resistance of the diode 31 effectively short circuits the current limiting resistor 32 so that no appreciable bias current traverses the resistor.

While I have described and illustrated only a preferred embodiment of my invention by way of example various modifications will occur to those skilled in the art, and I therefore wish to have it understood that I intend in the appended claims to cover all modifications which fall within the true spirit and scope of my invention.

What I claim as new and desire to secure by Letters Patent of the United States is:

1. In combination, a direct current load circuit having a pair of input terminals and including two electrodes spaced apart in an environment including an electrolytically conductive fluid, the space between said electrodes being subject to local generation of low inverse potentials and said electrodes being subject to reverse current resulting therefrom, a power rectifier having high voltage direct current output terminals connected to said load circuit input terminals, switching means for disabling said power rectifier without disconnecting said input terminals from said load circuit, and means for maintaining a low unidirectional voltage of normal polarity across said input terminals when said power rectifier is disabled comprising a low voltage battery and a unilateral conducting device fixedly connected in series circuit relation across said input terminals in opposing voltage relation to the high voltage supplied through said power rectifier.

2. The combination of claim 1 wherein the high voltage output terminals of said power rectifier are fixedly connected to said load circuit input terminals and said disabling means comprises switching means for deenergizing the input circuit of said power rectifier.

3. The combination of claim 1 wherein said electrodes are conductively associated with an electrically conductive earth formation including saline water.

4. The combination of claim 1 wherein high voltage at the output terminals of said power rectifier is of the order of at least several hundred volts and the low voltage of said battery is substantially less than 100 volts.

5. The combination of claim 1 wherein said unilateral conducting device is a diode connected in blocking relation with respect to the output voltage of said power rectifier and a high resistance impedance element is connected in shunt circuit relation with said diode to supply charging current to said battery whenever the output voltage of said power rectifier exceeds the low battery voltage.

* * * * *